US006037034A

United States Patent [19]

Asseier et al.

[11] Patent Number: 6,037,034

[45] Date of Patent: Mar. 14, 2000

[54] METHOD OF PRODUCING FOIL FOR SURFACE PROTECTION OF PROFILE BODY

[75] Inventors: Bernd Asseier, Freiberg; Martin Dietz, Mainhardt; Jörg Golombek, Obertsenfeld, all of Germany

[73] Assignee: Werzalit AG & Co., Oberstenfeld, Germany

[21] Appl. No.: 08/763,306

[22] Filed: Dec. 10, 1996

[51] Int. Cl.[7] ........................ B32B 3/02

[52] U.S. Cl. .................... 428/76; 428/423.1; 428/425.1; 428/480; 428/481; 428/482; 428/503; 428/535.5; 427/372.2; 427/389.9; 156/307.3; 156/307.7

[58] Field of Search .................... 428/76, 425.1, 428/503; 442/280, 281, 283, 286, 287, 289, 290; 156/423.1, 480, 481, 482, 532, 537.5, 307.3, 307.4, 307.7; 427/335, 372.2, 389.9

[56] References Cited

U.S. PATENT DOCUMENTS

| | | | |
|---|---|---|---|
| 4,207,379 | 6/1980 | Fock et al. | 428/480 |
| 4,503,115 | 3/1985 | Hemels et al. | 428/281 |
| 4,750,961 | 6/1988 | Pflug et al. | 156/212 |
| 5,034,084 | 7/1991 | Schafer et al. | 156/278 |

FOREIGN PATENT DOCUMENTS

| | | |
|---|---|---|
| 4210528A1 | 10/1993 | Germany . |

*Primary Examiner*—Elizabeth Evans
*Attorney, Agent, or Firm*—Michael J. Striker

[57] ABSTRACT

A foil for forming a surface protection layer on a profiled body is produced by a method including forming a carrier foil impregnated with an impregnating resin which is an aqueous condensation resin having a higher volatile component content during coating and a lower volatile component content during lacquering, and applying a lacquer layer of a lacquer which is an aqueous system of a polymerisate containing an OH-group, wherein the foil prior to its application on the profile body has a relatively low end moisture.

6 Claims, 1 Drawing Sheet

METHOD OF PRODUCING FOIL FOR SURFACE PROTECTION OF PROFILE BODY

BACKGROUND OF THE INVENTION

The present invention relates to a method of producing a foil for forming a surface protection layer on a profile body.

More particularly, it relates to a method of producing a foil which has a carrier foil impregnated with a duroplastic impregnating resin and provided with a lacquer layer.

Methods of the above mentioned general type are known in the art. One of such methods is disclosed for example in the German patent document DE-A42 10 528. A foil produced in accordance with this known method can be formed for example as a paper foil which is impregnated with a melamine resin, with a layer of polyurethane lacquer arranged on it.

When the foil produced in accordance with the known methods is utilized for coating of a strongly structured profile body, for example a profile body with vertical surfaces which are connected under a dull angle to a horizontal surface, then the foil is subjected to a strong mechanical loading, for example to a shearing. As a result, the lacquer of the outer lacquer layer of the foil can be sheared on partial surfaces either completely, or it can displace on the foil so that a non-uniform distribution occurs. Moreover, parts of the lacquer can be chipped off or microcracks can be formed in the lacquer. In any case, these phenomena on the lacquer can lead to a weakening or destruction of the protective layer.

SUMMARY OF THE INVENTION

Accordingly, it is an object of the present invention to provide a method of producing a foil of the above-mentioned type, which avoids the disadvantages of the prior art.

More particularly, it is an object of the present invention to provide a method of producing a foil of the above-mentioned type, such that the foil is resistant during its further treatment; and moreover the weather resistance of the foil is improved.

In keeping with these objects and with others which will become apparent hereinafter, one feature of the present invention resides, briefly stated in that method of producing a foil for forming a surface protective layer on a profile body, having a carrier foil impregnated with a thermosetting impregnating resin and provided with a lacquer layer, wherein the impregnating resin is an aqueous condensation resin which during impregnation contains substantially 40–60 weight percent of volatile components and the impregnated foil before a lacquering step contains 8–20 weight percent of volatile components, the lacquer is an aqueous system composed of an OH groups-containing acrylpolymerisate, polyurethane polymerisate or polyester copolymerisate with a cross-linking component which on the one hand cross-links a lacquer binder and on the other hand enhances a chemical connection with the impregnating resin of the carrier foil, and the foil is impregnated before applying on the profile body to an end moisture of 2–20 weight percent.

When the method is performed in accordance with the present invention, it eliminates the disadvantageous of the prior art and provides for the above mentioned highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
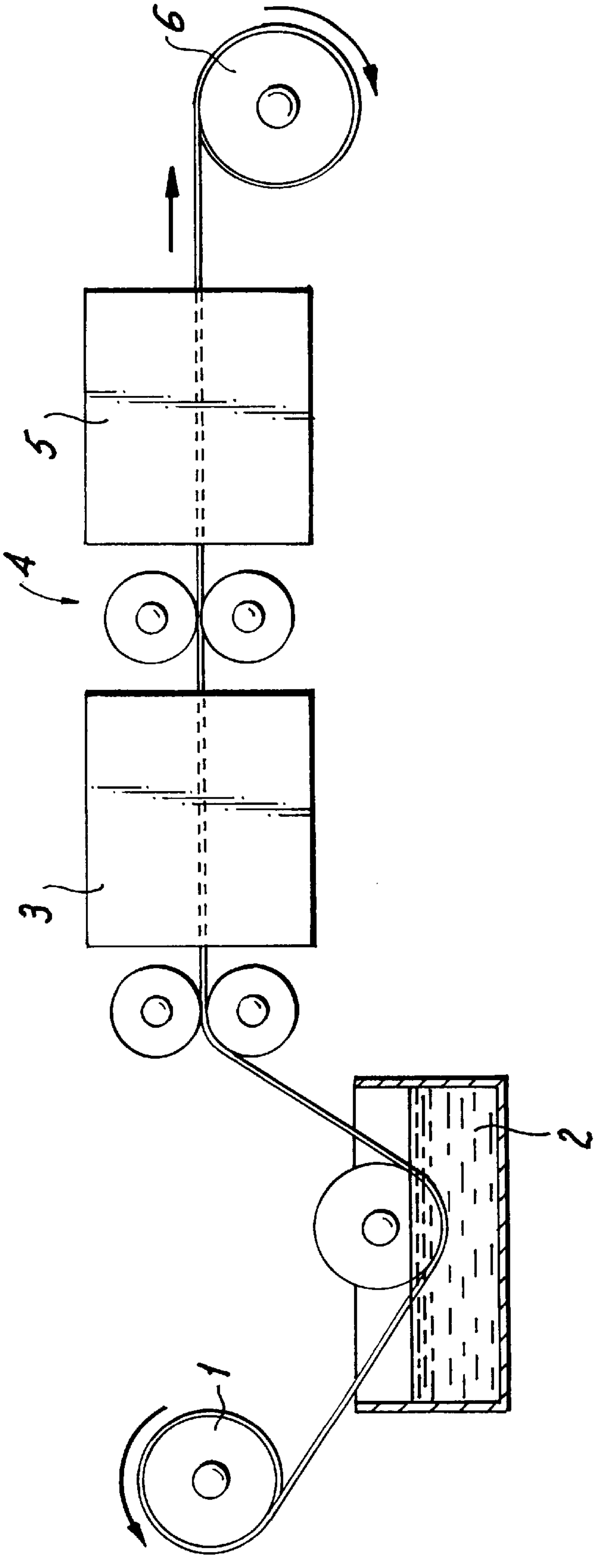
FIG. 1 is a view schematically showing a device for producing a foil in accordance with a method of the present invention.

In accordance with the present invention, a foil for forming a surface protective layer on a profiled body is produced. It has a carrier foil which is impregnated with a thermosetting impregnating resin and provided with a lacquer layer. In the method of the invention, the impregnating resin is an aqueous condensation resin. During the impregnation it has substantially 40–60 weight percent of volatile components. The impregnated foil before a lacquering step however has 8–20 weight percent of volatile components.

The lacquer is an aqueous system of acryl polymerisate, polyurethane polymerisate or polyester copolymerisate which contain an OH group. A cross-linking component is added to the lacquer. On the one hand it cross-links a lacquer binder, and on the other hand it enhances a chemical connection with the impregnating resin of the carrier foil.

The foil before its application on the profile body is impregnated to an end moisture of 2–20 weight percent. Preferably, the end moisture is 4–10 weight percent.

In the finished foil the thermosetting resin is sufficiently dried, so that after pressing it is hardened on the profile body. The lacquer is also continuously cured during the drying. The finished foil is composed of two homogenous layers, namely the carrier foil and the lacquer layer. Because of the set material in a border region between the homogenous layers, a mixing of the materials and chemical reaction between them occurs.

The foil produced in accordance with the inventive method is especially suitable for applying onto profile bodies which are continuously subjected to the action of weather and must exhibit a long-term weather resistance. Such profile bodies can be for example mold-pressed profiles for balcony or fassade linings as well as pressed boards and wooden chip molded parts, such as chip boards, fiber boards, or veneer boards. The profile body can be also a window board, a window profile, a roof element, a table plate, etc.

A chip- or fiber forming mixture can be for example a non-flowable mixture of comminuted ligno-zellulose containing particles, such as comminuted dried wooden chips, bagasse fibers etc. with a thermosetting binder on duroplastic base, such as melamine-urea formaldehyde- or phenol formaldehyde resin. Instead of the comminuted and dried wooden or bagassa fibers, also fibers of other materials can be used, such as for example glass fibers, stone wool and asbestos fibers alone or mixed with one another, with a corresponding preferably organic binder.

The device for producing a foil in accordance with the method of the present invention is shown in FIG. 1. An uncoated foil composed for example of a paper with a printed pattern is wound on a roll 1. The foil is pulled from the roll 1 and transported through a container 2 which is filled with impregnating resin. An aqueous solution which contains phenol formaldehyde resin or melamine formaldehyde resin with substantially 50 weight percent of volatile components is used as the impregnated resin. The impregnated foil is dried in a dryer 3 at temperatures of 100–180°, so that when it leaves the dryer it contains only 8–20 weight percent of volatile components.

A clear or pigmented lacquer is accommodated in a lacquering mechanism 4. For the lacquer the following binder compositions are suitable:

10 KG of hydroxyl acrylate (M=1 000 000) with an OH-group content of 3%, together with 2.9 KG of trimer hexamethylene diisocynate.

10 KG of a hydroxyl group-containing polyester resin (% OH=1) with an intermediate molmass of 500 000, together with 1.7 KG of an addition product of 3 mols of isophorone diisocynate and one mol of trimethylole propane.

10 KG of hydroxyl group-containing polyurethane of intermediate molemass 750 000 and with a hydroxyl group content of 2.5%, together with 3.3 KG of a 1:1 mixture of isophorone diisocyanate (produced from 3 mol of isophoron dissocyanate and one mol of trimethylpropane) and trimer hexamethylene diisocyanate.

After the lacquering, the foil is guided through the second dryer, in which it is dried at temperatures of 100–180° C. so that when it leaves this dryer it contains 2–20 weight percent, preferably 4–10 weight percent, of volatile components. In the dryer, a chemical reaction, for example a cross-linking between the impregnating resin and the lacquer occurs and the layer is completely cured. The finally coated foil is wound on the drum 6.

The lacquer can have a slip additive, for example a paraffin. During drying the slip additive moves to the surface of the coated foil and enriches the surface. Thereby the coated foil has improved sliding properties which are advantageous during pressing onto the profile body.

It is however possible to apply a thin layer composed of a slip additive onto the lacquer layer of the coated foil. It can be for example a thin layer of hot sprayed paraffin.

It will be understood that each of the elements described above, or two or more together, may also find a useful application in other types of methods differing from the types described above.

While the invention has been illustrated and described as embodied in method of producing foil for surface protection of profile body, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters patent is set forth in the appended claims:

1. A profile body, comprising a body part, composed of a mixture of particulate material and a thermosetting synthetic resin and pressed under high pressure and heat supply; and a foil forming a surface protecting layer on said body part, said foil being applied on at least one side of said body part and also covering edges and produced by a method including the steps of providing a carrier foil, impregnating the carrier foil with a thermosetting impregnating resin; applying a lacquer layer on the carrier foil; using as an impregnating resin an aqueous thermosetting resin which during impregnation of the profile body contains 40–60 weight percent of volatile components and in the impregnated foil after pre-drying and before lacquering has 8–20 weight percent of volatile components; using as the lacquer an aqueous system of a substance selected from the group consisting of acryl polymerisate, polyurethane polymerisate and polyester polymerisate containing an OH-group; adding to the aqueous system a cross-linking component which cross-links a lacquer binder and also enhances a chemical connection with the impregnated carrier foil; and finally drying the foil so that the foil contains 2–20 weight percent of volatile components and the lacquer layer is completely cured and thereby the foil is especially suitable for resisting pressure gradients which usually occur during press-coating of profile bodies.

2. A method of producing a foil for forming a surface protection layer on a profile body, the method comprising the steps of providing a carrier foil, impregnating the carrier foil with a thermosetting impregnating resin; applying a lacquer layer on the carrier foil; using as an impregnating resin an aqueous thermosetting resin which during impregnation of the profile body contains 40–60 weight percent of volatile components and the impregnated foil after pre-drying and before lacquering has 8–20 weight percent of volatile components; using as the lacquer an aqueous system of a substance selected from the group consisting of acryl polymerisate, polyurethane polymerisate and polyester polymerisate containing an OH-group; adding to the aqueous system a cross-linking component which cross-links a lacquer binder and also enhances a chemical connection with the impregnated carrier foil; and finally drying the foil so that the foil contains 2–20 weight percent of volatile components and the lacquer layer is completely cured and thereby the foil is especially suitable for resisting pressure gradients which usually occur during press-coating of profile bodies.

3. A method as defined in claim 1, wherein said drying includes drying the foil before its application on the profile body to an end moisture of 4–10 weight percent.

4. A method as defined in claim 1, wherein the lacquer is a hydroxile acrylate with aliphatic polyisocyanate.

5. A method as defined in claim 1; and further comprising the step of providing a slip additive inside the lacquer layer.

6. A method as defined in claim 1; and further comprising the step of applying a slip additive onto the lacquer layer.P

* * * * *